E. M. JUDD.
Car Truck.
No. 37,099. Patented Dec. 9, 1862.
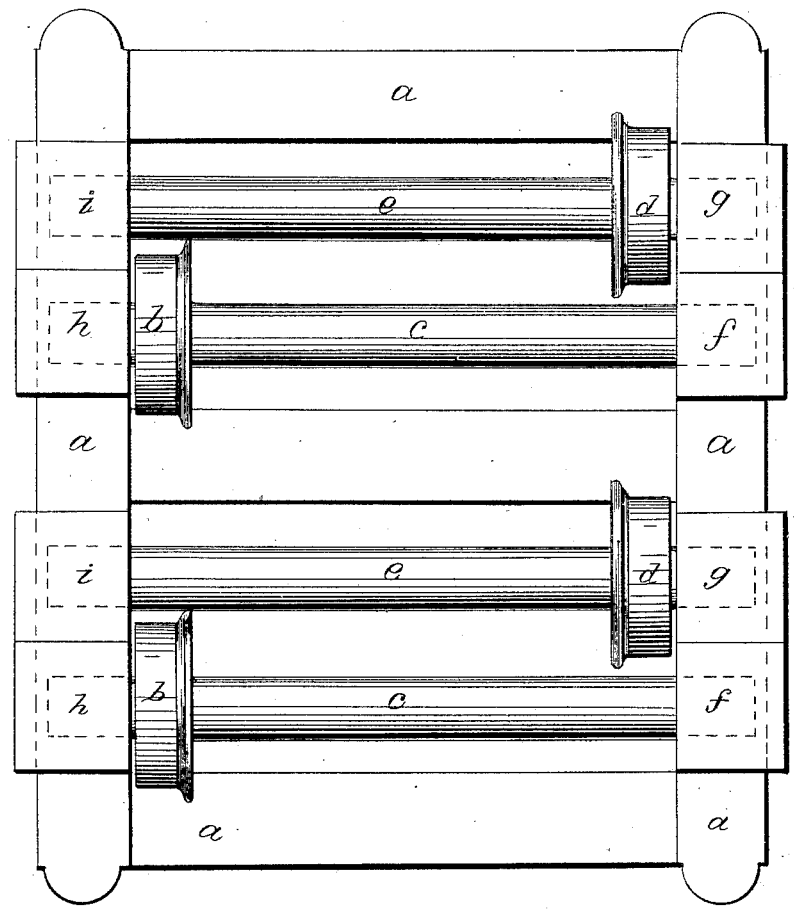

UNITED STATES PATENT OFFICE.

EDWARD M. JUDD, OF NEW BRITAIN, CONNECTICUT.

IMPROVEMENT IN TRUCKS FOR RAILROAD-CARS.

Specification forming part of Letters Patent No. 37,099, dated December 9, 1862.

*To all whom it may concern:*

Be it known that I, EDWARD M. JUDD, of New Britain, in the county of Hartford and State of Connecticut, have invented and made a certain new and useful Improvement in Trucks for Railroad-Cars; and I do hereby declare the following to be a full, clear, and exact description of my said invention, reference being had to the annexed drawing, making part of this specification, in which I have represented an inverted plan of said truck.

Trucks for railroad cars and engines have heretofore been made with the respective wheels on separate axles, in order that said wheels may turn independently of each other in traversing a curve. In this instance, however, these short axles extended only half-way across, the ends coming opposite to each other, at which point journal-boxes were provided; but these axles are so short that they have very little leverage in keeping the wheels steady when rolling on the track or encountering obstructions, such as the ends of the rails, &c. In other instances one sectional shaft with sleeves or collars has been employed with each pair of wheels.

My invention does not relate to either of the aforesaid devices; but it consists in parallel shafts or axles extending across or nearly across the truck-frame and receiving the wheels on opposite ends of the alternate shafts, so that each shaft has but one wheel and is free to rotate independent of the others, and the shafts have a sufficient length of leverage to insure the steady running of the wheels, and in consequence of one bearing of each shaft being at such a distance from the wheel but little friction or wear are experienced at that point.

In the drawing, $a$ is the truck-frame, which may be of any desired size or character. $b\,b$ are wheels on the axles $c\,c$. $d\,d$ are wheels on the axles $e\,e$. $f$ and $h$ are journal boxes or bearings to the axles $c\,c$, and $i$ and $g$ are journal boxes or bearings to the axles $e\,e$. These boxes or bearings may be of any desired character or size. It will now be evident that each wheel and its axle can turn independent of the others, and that the bearings $h\,h$ and $g\,g$ have no more friction and wear than usual, and that the bearings $i\,i$ and $f\,f$, being so far removed from the wheels, have but little friction or wear, and guide the respective wheels accurately in consequence of the length of leverage. The springs of the truck are to be of any required kind and proportioned to the pressure upon them. The bearings might be inside of the wheels, in which case the axles can lie closer together.

What I claim, and desire to secure by Letters Patent, is—

Arranging a series of axles in a truck for cars parallel to each other and fitted with the wheel at opposite ends of the alternate shafts, substantially as and for the purposes specified.

In witness whereof I have hereunto set my signature this 6th day of November, 1862.

E. M. JUDD.

Witnesses:
 LEMUEL W. SERRELL,
 CHAS. H. SMITH.